July 22, 1958 W. R. AYRES 2,844,309

COMPARING SYSTEM

Filed Nov. 20, 1952 2 Sheets-Sheet 1

INVENTOR.
William R. Ayres
BY Morris A. Laban
ATTORNEY

July 22, 1958 W. R. AYRES 2,844,309

COMPARING SYSTEM

Filed Nov. 20, 1952 2 Sheets-Sheet 2

INVENTOR.
William R. Ayres
BY Morris A. Rabkin
ATTORNEY

United States Patent Office 2,844,309

Patented July 22, 1958

2,844,309

COMPARING SYSTEM

William R. Ayres, Oaklyn, N. J., assignor to Radio Corporation of America, a corporation of Delaware Application November 20, 1952, Serial No. 321,697

12 Claims. (Cl. 235—61)

This invention relates to a system for comparing number values and more particularly to a method and apparatus for comparing the relative binary values of two binary encoded electrical signal messages, and determining which is the greater and which is the lesser.

Sorting large masses of unprocessed information into appropriate classifications is one of the major tasks that have been presented to electronic information handling machines and digital computers. The process of sorting involves changing the information from its original numeric or alphabetic form to a code form, storing the pieces of information or characters in a storage device, and comparing character with a standard or with other characters in accordance with desired classifications.

A preferred code form used by information handling machines is the binary code. Common examples of binary signal forms are a pulse and the absence of a pulse, or positive and negative pulses respectively representing the binary digits 1 and 0. Comparison of two binary characters may be performed by determining if the binary number representing one character is greater than, less than or equal to the binary number of the other character. Thus, the binary values of characters are compared as numbers although the characters themselves may represent letters of the alphabet or other information.

Among obvious methods of approach, one finds simple subtraction of one binary character from another with the comparison based upon observation of whether the difference is positive, negative or zero. Simple digital subtraction entails the problem of "borrowing" or its equivalent; it must be performed in several separate steps; and it requires timing pulses. This method may be appropriate in a synchronous system in which the storage medium, such as a magnetic drum, supplies the characters at an unvarying, predetermined rate. But it is inconvenient in an asynchronous system utilizing magnetic storage tape where character spacing and read-out are not sufficiently uniform.

Another method of approach is that of serial comparison, one by one, of corresponding digits in two characters with the decision based upon the first superiority to appear. This, at first glance, is neat and attractive in simply stated principle since comparison may be terminated before the characters are completely scanned. However, series comparison entails parallel to series conversion of information stored in parallel, as on magnetic tape. An undesirable feature of parallel to series conversion is the delaying, or temporary storing, for different time periods of each of the digits. This raises problems of stability and reliability. Other problems are the scanning process itself, recognition "on the fly" and resetting the scanner. Possibly a series comparison device could be made to work with fewer than the number of electron tubes required in a device embodying this invention. However, the arrangement is inherently complicated with the accompanying inconvenience of design, likelihood of false operation, and difficulty of servicing.

In view of the many favorable characteristics of magnetic tape as a storage medium for large quantities of data, a comparison system compatible with magnetic tape storage is desirable. This requires an asynchronous comparison system which does not depend on precise uniformity of information supply. A parallel comparison system offers this possibility.

Assume that numbers, letters or other characters to be compared are represented by a six bit (binary digit) code, the various code tracks (digits) having the usual values $2^5$, $2^4$, $2^3$, $2^2$, $2^1$, $2^0$. A six bit message or character may assume any of the equivalent decimal values between 0 and 63 inclusive. Now, if two coded characters, which may be called A and B, are converted to analogue form, i. e. to voltages proportional to their binary value, then a simple voltage discriminator should tell which is the greater, especially if one character is considerably greater than the other, say 63 to 6. But in the extreme case, the discriminator would have to handle properly the comparison of voltages related as 63 is to 62, which implies the need for considerable accuracy in the discriminator as well as in the apparatus for producing voltages proportional to the original binary value.

The achievement of this order of accuracy within ordinary design limitations is not generally feasible. The limitations that equipment be workable with any and all combinations of preassigned components and vacuum tube variations prevent the attainment of the accuracy required. Yet these limitations have to be met in practical electronic information handling equipment, where great quantities of equipment must operate with perfect accuracy over long periods of time, with very infrequent maintenance or tube replacement.

Accordingly, an object of this invention is to provide a new system for comparing quantities in binary form.

Another object of this invention is to provide a reliable system for parallel comparison requiring simple comparator equipment.

Still another object of this invention is to provide practical binary comparator apparatus of high reliability.

Yet another object of this invention is to provide an accurate comparator which is easy to service and maintain.

These and other objects of this invention are achieved by comparing binary characters in a plurality of comparison stages, and by comparing relatively small subdivisions of the original characters. In the specific embodiment described below, an A and a B character are compared, each having six bits (binary digits) in the form of pulses and absence of pulses, which are arranged in order from a highest to a lowest order. The characters are each subdivided into three pairs of adjacent bits, with the order of bits in the original characters maintained in each pair. Each A and B pair of bits of corresponding order are compared in binary value by a separate comparator unit in an initial stage. Each comparator unit has an A and a B output track. A pulse is produced at the output track of the pair which has the greater binary value, and there is an absence of pulse when it is lesser or equal in value. The three initial stage comparator units are themselves arranged in order, so that the A and B outputs from these units may also be treated as an A and a B group of ordered signal bits forming two binary characters of three bits each. The binary values of the A and B three-bit characters have the same relationship as the original six-bit character, and thus may be treated in a manner similar to the original characters. The two highest order bits of each three-bit character are paired and compared in binary value by an intermediate stage comparator unit. The A and B outputs from the intermediate comparator unit are then paired with the corresponding outputs from the lowest order initial stage unit (which are not yet compared). These A and B pairs of digits are compared in binary value in a final stage unit. Since the relative order of bits in the original characters is maintained in all the comparison stages as well as in succeeding pairs of signal bits, the final stage unit output indicates which of the original characters is greater in value.

Each of the comparator units in the preferred embodiment of the invention operates on a parallel comparison principle and is of the same construction. Each unit includes an A and a B digital-to-analogue converter for converting the A and B binary pairs to signals having proportional amplitudes; a discriminator having an A and a B output for sensing the difference between the amplitudes of A and B signals and for producing output signals representative of the difference; and a pulse standardizer (except for the final stage) in order that succeeding stage inputs are uniform.

The novel features of the invention as well as the invention itself, both as to its organization and method of operation, will best be understood from the following description, when read in connection with the accompanying drawings in which.

Figure 1:
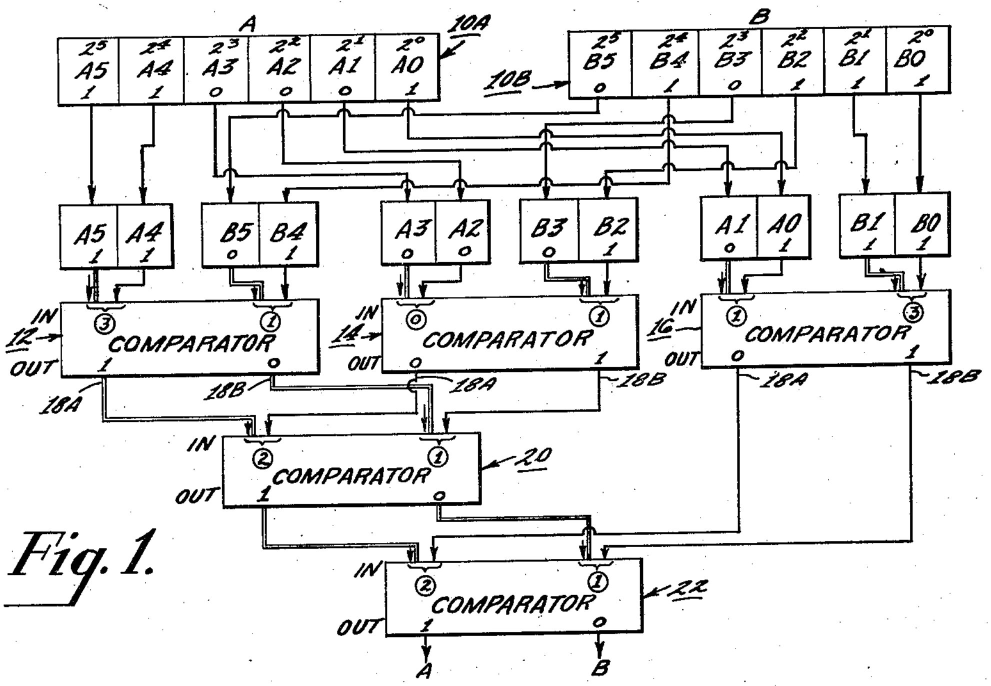
Figure 1 is a block diagram illustrating the principles of the invention.

Referring now to Figure 1, there is shown a system for parallel comparison of two binary encoded messages or characters A, B, each composed of six bits A5 through A0, B5 through B0 arranged in order and having binary values $2^5$, $2^4$, $2^3$, $2^2$, $2^1$, $2^0$ respectively. For convenience in description, the signal code of a pulse for the digit 1 and the absence of a pulse for digit 0 is assumed. The A and B characters are stored in a storage device 10A, 10B having six register elements or tracks. The storage device may be of any suitable type, such as magnetic or perforated tape, a magnetic drum, static magnetic delay lines or a trigger circuit register.

Adjacent order bits in each character are paired off with the order of the bits in the original characters maintained in the pairs. Double line connections are used in Figure 1 to indicate the higher order bit in each pair. Thus, A5, A4 form a pair, A3, A2 form another, etc. Each of the three A pairs of bits is then compared with the B pair of bits of corresponding order.

Three comparator units 12, 14, 16 in an initial stage are provided for comparing corresponding A and B pairs. The comparator units are also arranged in order so that the third or highest order comparator unit 12 receives the highest order pairs of bits, the second order unit 14 receives the second order pairs, and the first or lowest order unit 16 receives the lowest order pairs. Each comparator unit determines whether the A or B pair has the greater binary value, and produces signals representing that decision at A and B output terminals 18A, 18B. An output pulse represents the superior pair, and the absence of a pulse represents the decision of less than or equal to.

The three A output signals and the three B output signals from the initial stage comparator units 12, 14, 16 considered according to order of comparator units, each represents a binary number. The relation in binary value of these A and B numbers is the same as the relation of the original A and B characters. The reason is that 1, the output representing superior, is manifestly greater than 0, representing inferior, and the relative order of comparison outputs is the same as that of the original bits. Therefore, the comparison process may be repeated with the A and B output characters in a second stage, and then repeated again with the outputs from the second stage until a single A or B output pulse is produced in a final stage. This final stage output indicates which of the original characters is superior.

As shown in the illustrative diagram of Figure 1, the outputs at the A and B terminals 18A, 18B of the third and second order units 12, 14 are channeled to form an A and B signal pair, with the outputs from the third order unit 12 forming the higher order bit of each pair, as indicated by the double line connections. These pairs are applied to and compared in an intermediate stage comparator unit 20. The A and B output signals from the first order initial stage unit 16 are then paired with the A and B outputs from the intermediate stage unit 20, and applied to a final stage comparator unit 22. The intermediate stage comparison outputs relate to higher order bits in the original A and B characters than the first order initial stage outputs, and therefore, form the higher order bit of each final stage signal pair. The outputs of the final stage unit 22 are a pulse at one output terminal and the absence of a pulse at the other respectively indicating superior and inferior characters, or the absence of pulses at both terminals indicating equal value characters.

The A and B pairs of signals may be compared as independent binary numbers without regard to the actual values they represent or relate to in the original characters since a simple decision of superiority, or relative value, is all that is required. The signal pairs and comparator units are all ordered in a manner consistent with the order of original bits so that relative binary values of output signal characters at any stage correspond to relative values of the original characters.

In Figure 1, an example of the comparison of two binary characters is shown. The A character 110001 is compared with the B character 010111. The two highest order digits 11 in the A character are compared with the corresponding digits 01 in the B character in the highest order comparator unit 12. Thus, the binary number 11 is compared with the binary number 01. The value of the A pair is three and the value of the B pair is one. The decimal values of the binary pairs are encircled in the drawing. Three being greater than one, there will be an output pulse at the A output terminal 18A and the absence of the pulse at the B terminal 18B which are shown as 1 and 0, respectively. Correspondingly, in the second order comparator unit, 00 is compared with 01, and the outputs at the A and B terminals are respectively 0 and 1. In the lowest order comparator unit 01 is compared with 11, and here again the A and B outputs are respectively 0 and 1. Considering the A and B outputs produced by the initial stage comparator units, they form an A output character of 100 and a B output character 011. The relative binary value of these output characters is the same as the relative value of the original characters.

The outputs of the third and second order comparator units 12 and 14 are applied as A and B signal pairs to the intermediate comparator unit 20. The A pair is 10 and the B pair is 01 producing A and B intermediate stage outputs of 1 and 0 respectively. The A and B intermediate stage outputs are then paired with the lowest order initial stage outputs so that an A pair 10 and a B pair 01 is applied to the final stage unit 22. The A and B outputs of the final stage are 1 and 0 respectively, indicating that A is the superior character. Thus, although the B pairs were superior in the first and second order initial stage comparison units 16 and 14, the proper ordering of outputs in relation to the order of the original bits produces the correct result.

The system of comparing of this invention is not restricted to six-bit characters. The same general plan holds for any number of bits in the original characters.

In general, it may be said for $n$-bit characters, $n-1$ comparator units are required. Where the character has an odd number of bits, the higher order bits are paired for comparison in the initial stage, and the lowest order bit is paired subsequently and compared in a succeeding stage.

In the actual circuitry used to perform the comparisons, the comparator units are preferably constructed to be identical, so that each comparator unit becomes an interchangeable building block readily adaptable to either simple or complex comparing problems. In the preferred form of comparator unit, the functions of addition of signals, subtraction of signals, sign recognition and restoration of signal amplitude are carried out. Circuits for performing each of these functions separately are well known. Circuits for the mathematical functions are described in "Waveforms," by Chance, McGraw-Hill, 1949, chapter 18.

Figure 2:
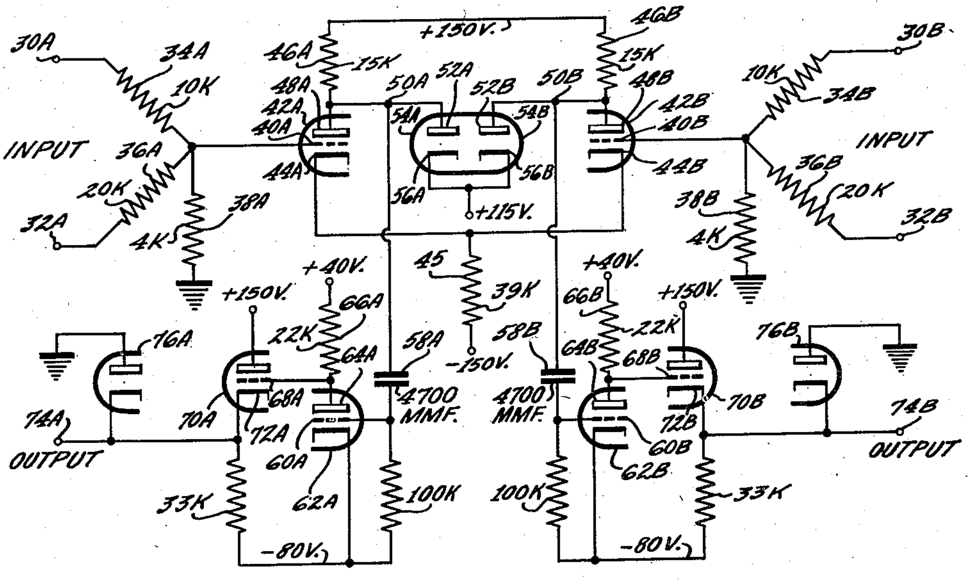
Figure 2 is a schematic circuit diagram of a comparator unit embodying this invention.

A preferred comparator unit embodying this invention is shown in Figure 2. Each unit is made up of an A and B digital-to-analogue converter, a difference amplifier, and a pulse standardizer. Conversion of each A and B pair of pulses to analogue voltages is by simple resistance mixing. The high and low order bits of each A and B pair are applied to high and low order input terminals 30A, 32A, 30B, 32B which have high and low order resistors 34A, 36A, 34B, 36B respectively connected thereto. The high and low resistors are joined to a common resistor 38A, 38B which is connected to ground. The resistors are chosen such that the conductance of the high resistor 34A, 34B is twice that of the low resistor 36A, 36B, so that the effect, at the junction of the resistors, of a pulse applied to the high input terminals 30A, 30B is twice that of a pulse applied to the low input terminals 32A, 32B. Thus, double weight is given to high order pulses in order that the junction voltage is proportional to the binary value of the pair of bits. For the component values given in Figure 2, and for input pulses of 40 volts, an output pulse of 5 volts is produced at the junction of the resistors for a pulse only at the low input terminal, an output of 10 volts for a pulse only at the high input terminal and an output of 15 volts for pulses at both input terminals. Thus, the junction voltages are directly proportional to the binary values of the signal pairs applied to the input terminals. While proportionality of analogue voltages to binary values is preferred, the invention is not restricted to that system of conversion. Any appropriate relative weighing of high and low order bits in each pair may be used, so long as the high order bit is given greater weight.

The A and B analogue voltages are applied to the grids 40A, 40B of A and B triodes 42A, 42B of a difference amplifier. The cathodes 44A, 44B of the triodes are connected to a common cathode resistor 45, and each triode has an anode load resistor 46A, 46B connecting the anode 48A, 48B to a source of operating potential. A and B outputs are taken from terminals 50A, 50B at the anodes of the A and B tubes. The difference amplifier arrangement described thus far is similar to the one discussed in "Electronics-Experimental Techniques," by Elmore, McGraw-Hill, 1949, at page 54.

The difference amplifier is modified for purpose of this invention by respectively connecting the anodes 52A, 52B of a double diode 54A, 54B to the anodes 48A, 48B of each triode. The cathodes 56A, 56B of the diodes are connected to a reference potential level, which is slightly below the triode anode potential when it is in standby condition.

The difference amplifier functions as an amplitude discriminator and it indicates the equality or inequality of voltages applied to the grids 40A, 40B of the triodes 42A, 42B. The anode potentials of the triodes are equal for equal grid voltages, with balanced circuit components such as shown in Figure 2. An inequality of grid voltages results in an inequality of anode voltages that is opposite in sense and proportionate in magnitude to the inequality of the grid voltages. When the A grid voltage is greater than the B grid voltage, the anode voltage of the A triode falls and the anode voltage of the B triode tends to rise. The diodes have the function of preventing a rise in potential at the anode of either tube. As a result of this "clamping" action, in the example given, additional current flows in the A tube. Thus, there is additional amplification in the A tube producing a larger A tube output signal of negative polarity. At the same time the B output signal of positive polarity, which is not needed for the circuitry used, is eliminated. A negative output pulse at the A or B difference amplifier terminal 50A, 50B indicates superiority of input. When the inputs are equal, the outputs are insufficient in amplitude to affect the pulse standardizers to which they are applied. If positive-going output pulses are desired for indicating superiority, the A and B output terminals 50A, 50B are simply interchanged, and the diodes 54A, 54B are inverted.

Each difference amplifier output terminal 50A, 50B is coupled through a condenser 58A, 58B to the grid 60A, 60B of an inverter amplifier 62A, 62B which has its anode 64A, 64B connected through a load resistor 66A, 66B to a source of operating potential. The anode 64A, 64B of the inverter is also connected to the grid 68A, 68B of a cathode follower 70A, 70B which has its cathode 72A, 72B connected to an output terminal 74A, 74B. A clamping diode 76A, 76B clamps the potential level of the output terminal 74A, 74B to ground. The inverter amplifier 62A, 62B is normally conducting, so that a negative pulse from the difference amplifier cuts the inverter tube off, causing its anode 64A, 64B to rise. The grid 68A, 68B of the cathode follower 70A, 70B also rises, and its cathode 72A, 72B follows that rise to produce a positive pulse at the output terminal 74A, 74B. The anode rise of the inverter 62A, 62B is to its supply voltage, which is 40 volts for the circuit shown in Figure 2. The cathode of the cathode follower 70A, 70B likewise rises slightly in excess of 40 volts, so that a standard output pulse of approximately forty volts is produced. Upon termination of the pulse from the difference amplifier, the inverter 62A, 62B is again rendered conductive, and the output terminal 74A, 74B returns to substantially ground potential by the clamping action of the diode 76A, 76B.

In each comparator unit, the A and B pairs of voltage pulses applied to the input terminals 30A, 32A, 30B, 32B are added in the A and B converter circuits, with double weight given to the high order voltage pulse of each pair. The sum of each of these voltage pairs is proportional to the binary value of the input pair of bits. The difference amplifier discriminates between the amplitudes of the conversion voltages by a subtraction process, and recognizes the sign of the result by producing a negative-going pulse of substantial amplitude to indicate superiority. When the inputs are equal, the difference amplifier outputs are insufficient in amplitude to affect the pulse standardizer. Thus, an output pulse is produced by only one of the standardizer circuits, and then, only if there is an inequality in the inputs.

It may be seen that the amplitude of the standardized output pulse is controlled almost entirely by the anode supply potential for the inverter tube, and may be regulated to the desired potential with whatever stability is desired. The differences in magnitude in outputs from the difference amplifier have no effect on the amplitude of the pulse produced at the standardizer output terminal. Between pulses, the output terminal is held at substantially ground potential. These conditions prevail whether the occurrence of input pulse is rapid or slow, steady or irregular. Therefore, the standardized output is in every way suitable for direct application to the input terminal of a comparator unit in a succeeding stage. The component values shown in Figure 2 are for use with pulses of about 20 microseconds duration, occurring at multiples of 100 microsecond intervals. The triodes used in this circuit are 12AU7 and the diodes are 6AL5. These component values are given for purposes of showing an operative embodiment and not to be construed as limitations on the invention.

In the embodiment of this invention described thus far, the original characters have been subdivided into sets of two-bits each. It is found that subdivision into signal pairs in this manner provides the greatest reliability in results achieved. However, the invention is not restricted to subdivision into signal pairs. Characters may be subdivided into sets of a plurality of bits in any convenient fashion. Furthermore, the subdivision in each stage need not be uniform. For example, in the six-bit characters discussed above, the initial subdivision may be into sets of three bits each, and the second stage subdivision would be into sets of two bits each. This reduces the number of comparator units required for each character to be compared. However, it also decreases the reliability of each comparison and increases the accuracy requirements of components used. In general it may be said that given characters of N bits, they may be subdivided into K ordered sets of L bits and one set of M remaining bits (preferably those of lowest order) where $K \times L + M = N$, K and L are greater than 1, and M is less than L.

Figure 3:
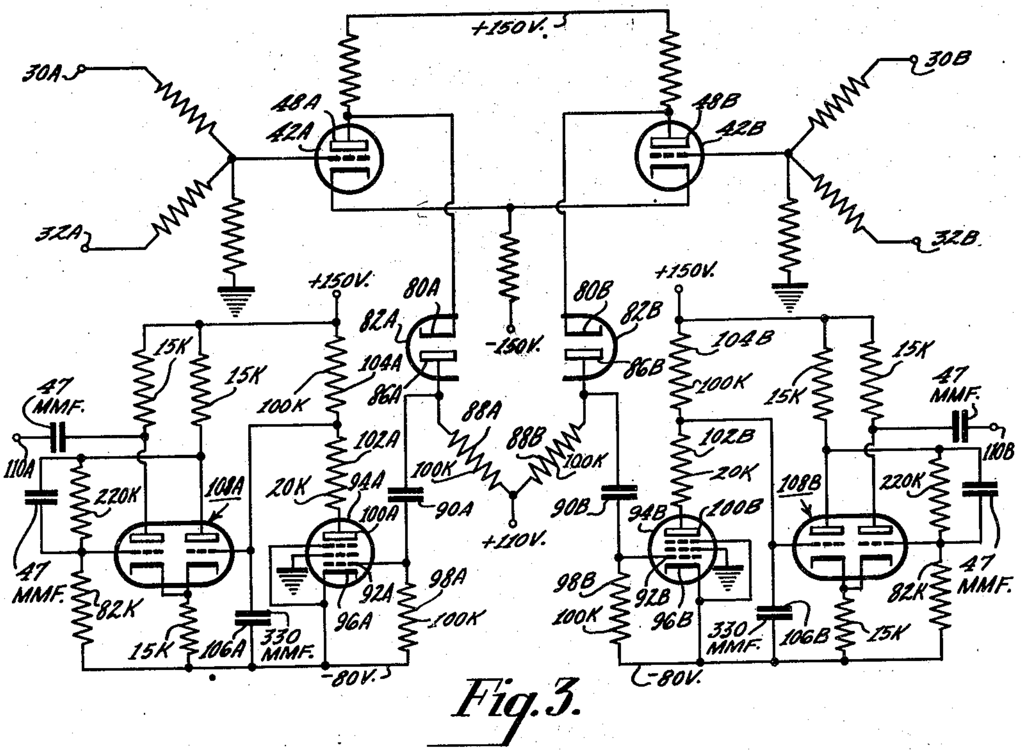
Figure 3 is a schematic circuit diagram of a final stage comparator unit and of an output circuit therefor.

The utilization device to which the final stage output is applied usually does not require the standardized pulses produced by the comparator unit of preceding stages. Thus, the pulse standardizer may be eliminated from the final stage unit. In Figure 3, there is shown a circuit diagram of a final stage unit and an output circuit therefore. In the final stage unit, the A and B analogue circuits and difference amplifier are the same as previously described except that the clamping diodes in the difference amplifier are eliminated. The same reference numerals are used where the components are the same as in the circuit of Figure 2. The anodes 48A, 48B of the A and B difference amplifier triodes 42A, 42B are connected to the cathodes 80A, 80B of A and B output diodes 82A, 82B. The anode 86A, 86B of each diode is connected to a source of positive potential through a load resistor 88A, 88B. The anode 86A, 86B of each diode is also coupled through a capacitor 90A, 90B to the control grid 92A, 92B of an A or a B pentode 94A, 94B. Each control grid 92A, 92B is connected to the cathode 96A, 96B of the pentode through a resistor 98A, 98B. The anode 100A, 100B of each pentode is connected to a source of operating potential through a first and second load resistor 102A, 104A, 102B, 104B, and an integrating condenser 106A, 106B is connected from the junction of the load resistors across the pentode 94A, 94B. The junctions of the anode load resistors of the A and B pentodes are also connected respectively to A and B Schmitt trigger circuit 108A, 108B. An output terminal 110A for A superiority is coupled to the A trigger circuit 108A, and a B superiority output terminal 110 B is coupled to the B trigger circuit 108B.

The output diodes 82A, 82B function as one-way valves and are normally not conducting since each cathode 80A, 80B connected to the anode 48A, 48B of a difference amplifier triode 42A, 42B is at a higher potential than the source applied to the anode load resistor 88A, 88B of the diode. The A or B diode 82A, 82B conducts when a negative output pulse is produced at the anode 48A, 48B of the A or B difference amplifier triode. This results in a negative pulse at the A or B diode anode 86A, 86B, and it is applied to the control grid 92A, 92B of the A or B pentode 94A, 94B. Each pentode is normally at zero bias and therefore conducting. A pentode is cut off only when it receives a negative output pulse of substantial amplitude, representative of an inequality, from a difference amplifier. The integrating condenser 106A, 106B, connected across each pentode 94A, 94B is kept in an essentially discharged condition when the tube is conducting. When a negative voltage pulse from the anode 86A, 86B of a diode 82A, 82B is applied to the control grid 92A, 92B of the corresponding pentode, the pentode is cut off, and the voltage across the integrating condenser 106A, 106B rises. When this voltage reaches a certain predetermined level, the Schmitt trigger circuit 108A, 108B connected thereto is triggered and a positive-going pulse is provided as an output.

A Schmitt trigger circuit is one wherein there are two stable conditions. A voltage having a certain minimum value is required to drive it from one condition to the other. The trigger circuit stays in the condition to which it is driven until the applied voltage is removed or drops to a value below the triggering value at which time it returns to its original condition. The operation of a Schmitt trigger circuit is well known in the art and is described in "Time-Bases," by Puckle, first edition, John Wiley and Sons, at page 57.

The reason for using the integrating circuit, consisting of the pentode 94A with the condenser 106A thereacross, is that pulses making up the original A and B characters to be compared may not all start or end together, and may not have identical durations. Furthermore, the number of comparison stages may not be the same for all of the bits. For example, in the comparison of the six-bit characters, as described above, the lower order bits pass through one less stage than high order bits. Thus, comparison outputs for these bits are applied to the final stage comparator unit slightly ahead of the comparison outputs for the other bits. Accordingly, some means must be provided to prevent spurious outputs resulting from final stage input pulses not being coincident.

The problem is solved by providing the integrating circuit as an output circuit for the final comparator stage. The integrating circuit requires that a final stage output pulse have a substantial duration to charge the integrating condenser 106A, 106B to a voltage sufficient to drive the Schmitt trigger circuit 108A, 108B. Thus, short duration output pulses of a spurious nature are eliminated, and only true decision pulses are produced at the A superiority and B superiority output terminals 110A, 110B. Upon termination of the negative pulse applied to the pentode grid 92A, 92B, the integrating condenser 106A, 106B discharges through the pentode permitting the Schmitt trigger circuit to return to its initial stable condition.

The values of the additional circuit components suitable for the output circuit are shown in Figure 3. Pentodes for these components are of the 6AU6 type.

This invention has been described as applied to the binary code system utilizing the presence and absence of pulses for the binary digits 1 and 0 respectively. The invention may also be used for other binary code systems such as that of positive and negative pulses.

The invention is not limited in the type of comparator unit utilized. The amplitude discriminator system described above is preferred. Other circuits for amplitude subtraction may also be utilized. In addition, the comparator unit may be a digital subtracting circuit. Whatever comparator unit is used, comparison of subdivisions of the original characters in a plurality of comparator stages simplifies the comparator apparatus required for each stage and results in more reliable outputs.

Figure 4:
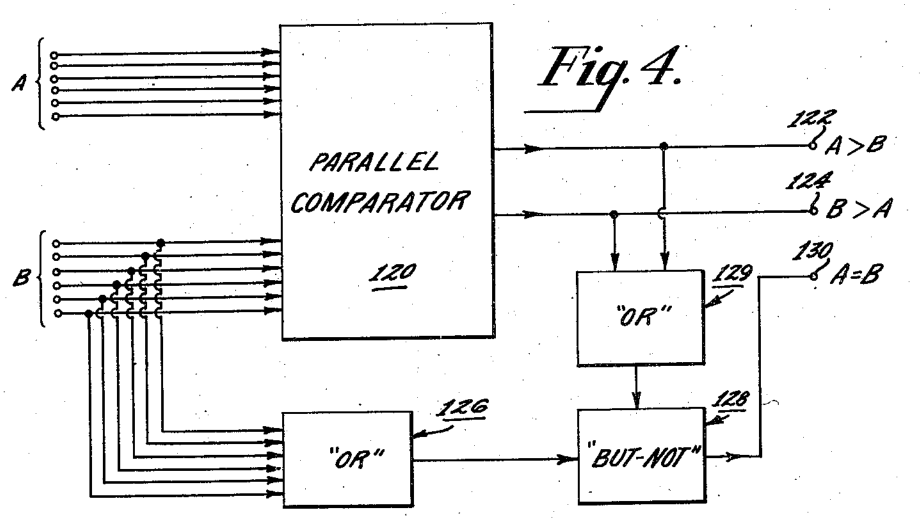
Figure 4 is a block diagram of a parallel comparator with auxiliary circuitry to provide an "equal-to" output.

In Figure 4, a block diagram is employed to show how an output signal representing equal value of the A and B characters is produced. This circuit is based on a coding system which does not use a character of all zeroes to represent information. Thus, each character will have at least one bit that is a "1"; that is, each character will be made up of at least one pulse. The bits of the A and B characters are applied to a parallel comparator 120 constructed in the manner described above. There is one output terminal 122 for A superiority and another terminal 124 for B superiority. In addition, the bits of either one of the characters, the B character as shown, are applied to an "or" circuit 126. This circuit produces an output pulse if any one or any combination of its inputs is pulsed. The output of the "or" circuit 126 is applied to the first input of a "but-not" circuit 128. The second input of the "but-not" circuit 128 receives inhibiting pulses from the output leads of the parallel comparator 120 through another "or" circuit 129. Thus, the second input is pulsed if there is a superiority output, but not if the A and B characters are equal. The "but-not" circuit produces an output pulse at its terminal 130 if its first input is pulsed but not if its second input is pulsed. That is, the "but-not" circuit transmits any pulse applied to its first input unless the pulse is inhibited by a pulse at the second input. Suitable "or" and "but-not" circuits are well known, and are described in "High-Speed Computing Devices," by Engineering Research Associates, McGraw-Hill, 1950, chapter 13.

For each pair of characters to be compared, the "or" circuit 126 is pulsed and produces a pulse which is applied to the first input of the "but-not" circuit 128. If there is A or B superiority, the second input of the "but-not" circuit is also pulsed. This second input pulse inhibits the first input pulse and the "but-not" circuit does not produce a pulse at the equality terminal 130. However, if there is A and B equality, the superiority terminals 122, 124 are not pulsed, and the second input of the "but-not" circuit pulsed does not receive an inhibiting pulse. Thus, the first input pulse is transmitted by the "but-not" circuit, and the equality terminal 130 is the only one to be pulsed.

A novel, useful and simple parallel comparator system has been described above. With this system, binary encoded characters may be compared with highly reliable results. The values of circuit components which are shown in the drawings are given to illustrate an operative embodiment. They are illustrative only and are not to be construed as a limitation on the invention.

What is claimed is:

1. Apparatus for comparing two binary numbers each represented by a plurality of coexistent signals of either of two types, one signal for each binary digit, said apparatus comprising means for ordering each number into smaller groups of digits, the same number order being maintained in each group, the order of each group being determined by the order of the digits within each group, separate first means to compare each of the same order groups in each number with each other in accordance with their value as separate binary numbers to provide an output indicative of which group is greater, separate second means to compare the outputs of each of the adjacent order first comparing means as binary numbers with the higher order comparing means output being evaluated as a higher order digit, and successive comparing means to successively compare preceding comparing means outputs on a binary number value basis to provide a resultant output indicative of the comparison of said two numbers.

2. Apparatus for comparing a first and a second binary encoded signal message each representing a binary number and formed by a plurality of coexistent signals of either of two types, said apparatus comprising a plurality of comparator units each having a first message and a second message set of a plurality of ordered input terminals and a first message and a second message output terminal and including means responsive to relative binary number magnitudes of first message and second message ordered signal sets applied to said input terminals thereof for producing output signals of either of two types representing greater than and less than at said output terminals thereof, means for applying a different one of said first and second binary encoded message signals to each of said input terminals of a plurality of initial ones of said comparator units, and means for respectively coupling said first and second message input terminals of a remaining one of said comparator units to different first and second message output terminals of said initial comparator units.

3. Apparatus for comparing a first and a second binary encoded signal message each representing a binary number of at least four digits and formed by at least a first, second, third and fourth signal of either of two types, said signals being arranged in order with said first and fourth signal being of lowest and highest order respectively, said apparatus comprising at least three comparator units each having a high and a low order first message input terminal and a high and low order second message input terminal and a first and a second message output terminal and including means responsive to relative binary number magnitudes of first message and second message ordered signal pairs applied to said input terminals thereof for producing output signals of either of two types representing greater than and less than at said output terminals thereof, separate means for respectively applying said first and second message first and second signals to said first and second message low and high order input terminals of a first one of said comparator units, separate means for respectively applying said first and second message third and fourth signals to said first and second message low and high order input terminals of a second one of said comparator units, and separate means for respectively coupling said first and second message output terminals of said first and second comparator units to said first and second message low and high order input terminals of a third one of said comparator units.

4. Apparatus for comparing as recited in claim 3 wherein each of said comparator unit responsive means includes separate means for converting each of said first message and second message ordered signal pairs to an analogue signal having a magnitude representative of the binary number represented thereby, and discriminating means responsive to said analogue signal magnitudes for producing first and second message signals representing the relative magnitudes of said analogue signals.

5. Apparatus for comparing as recited in claim 4 wherein each of said comparator unit responsive means includes a first message and a second message pulse standardizing means respectively coupled between said discriminating means and said first and second message output terminals and responsive to signals produced by said discriminating means for producing respectively a signal pulse and the absence of a pulse at one and the other of said output terminals when said analogue signals differ in magnitude and absence of pulses at both of said terminals when said analogue signals are equal in magnitude.

6. Apparatus for comparing as recited in claim 3 wherein each of said responsive means of at least said first and second comparator units includes a first and second message digital-to-analogue converting circuit each including relatively high and low magnitude resistors respectively coupled to said low and high order input terminals, and a common resistor having one end connected to said high and low magnitude resistors, a difference amplifier including a first and a second grid-controlled electron tube with the grids thereof respectively coupled to said first and second common resistors at said one end thereof, a common cathode resistor, and a clamping diode connected to the anode of each of said tubes, and a first and a second pulse standardizer circuit each including an inverter amplifier coupled to the anode of a different one of said electron tubes, a cathode follower coupled between said inverter amplifier and a different one of said comparator unit output terminals, and a clamping diode coupled to said one comparator unit output terminal.

7. Apparatus for comparing an A and a B binary encoded signal message each representing a binary number and formed by a plurality of coexistent signals of either of two types arranged from highest to lowest order, said apparatus comprising a plurality of comparator units each having a high and a low order A input terminal and a high and a low order B input terminal and an A and a B output terminal and including means responsive to relative binary number magnitudes of A and B ordered signal pairs applied to said input terminals thereof for producing output signals of either of two types representing greater than and less than at said output terminals thereof, a plurality of said comparator units forming an initial stage, at least one other of said comparator units forming at least one intermediate stage and still another one of said comparator units forming a final stage with said initial and intermediate comparator units being arranged from highest to lowest order corresponding to said message signal order, separate means for respectively applying each pair of adjacent signals of said A and B signal messages to said A and B input terminals of a different one of said initial comparator units of corresponding order with higher and lower order signals of each of said signal pairs being respectively applied to high and low order input terminals, separate means for respectively coupling said A and B output terminals of each adjacent pair of said initial comparator units to said A and B input terminals of a different one of said intermediate comparator units of corresponding order with said output terminals of higher and lower order initial comparator units respectively coupled to said high and low order input terminals, and separate means for respectively coupling said A and B input terminals of said final comparator unit to said A and B output terminals of two of said comparator units in preceding stages with said output terminals of said higher and lower order preceding comparator units respectively coupled to said high and low order input terminals of said final comparator unit.

8. Apparatus for comparing as recited in claim 7 wherein each of said comparator unit responsive means includes separate means for converting each of said A and B ordered signal pairs to an analogue signal having a magnitude representative of the binary number represented thereby, and discriminating means responsive to said analogue signal magnitudes representative of said A and B signal pairs for producing signals representing the relative magnitudes of said analogue signals.

9. Apparatus for comparing as recited in claim 8 wherein each of said binary coded signal message signals is a pulse or the absence of a pulse, each of said comparator unit responsive means includes an A and a B pulse standardizing means respectively coupled between said discriminating means and said A and B output terminals and responsive to signals produced by said discriminating means for producing respectively a signal pulse and the absence of a pulse at one and the other of said output terminals when said analogue signals differ in magnitude and absence of pulses at both of said terminals when said analogue signals are equal in magnitude.

10. Apparatus for comparing as recited in claim 7 wherein each of said responsive means of at least said initial and intermediate stage comparator units includes an A and a B digital-to-analogue converting circuit each including relatively high and low magnitude resistors respectively coupled to said low and high order input terminals, and a common resistor having one end connected to said high and low magnitude resistors, a difference amplifier including a first and a second grid-controlled electron tube with the grids thereof respectively coupled to said A and B common resistors at said one end thereof, a common cathode resistor, and a clamping diode connected to the anode of each of said tubes, and an A and a B pulse standardizer circuit each including an inverter amplifier coupled to the anode of a different one of said electron tubes, a cathode follower coupled between said inverter amplifier and a different one of said comparator unit output terminals, and a clamping diode coupled to said one comparator unit output terminal.

11. A comparator unit comprising a first and a second pair of high and low order input terminals, a first and a second pair of relatively high and low magnitude resistors respectively coupled to said first and second pairs of low and high order input terminals, a first and a second common resistor each having one end connected to a different one of said pairs of high and low magnitude resistors, a difference amplifier including a first and a second grid-controlled electron tube with the grids thereof respectively coupled to said first and second common resistors at said one end thereof, a common cathode resistor, and a separate clamping diode connected to the anode of each of said tubes to limit positive anode excursion to a value less than the anode bias, and a first and a second pulse standardizer circuit each including an inverter amplifier coupled to the anode of a different one of said electron tubes, an output terminal, a cathode follower coupled between said inverter amplifier and said output terminal, and a clamping diode coupled to said output terminal.

12. A difference amplifier comprising a first and a second tube each having an anode, a cathode and a control grid, a common cathode resistor having one terminal thereof connected to said cathodes, a separate load resistor connected to each of said anodes, means for applying an operating potential to said load resistors, means coupled to at least one of said tubes for deriving output signals, and a separate clamping diode coupling each of said anodes to a reference potential less than the anode bias potential.

References Cited in the file of this patent

UNITED STATES PATENTS

| | | |
|---|---|---|
| 2,434,487 | Dickinson | Jan. 13, 1948 |
| 2,441,579 | Kenyon | May 18, 1948 |
| 2,487,603 | Scales | Nov. 8, 1949 |
| 2,539,043 | Verneaux | Jan. 23, 1951 |
| 2,539,623 | Heising | Jan. 30, 1951 |
| 2,589,240 | Frye | Mar. 18, 1952 |
| 2,607,006 | Hoeppner | Aug. 12, 1952 |
| 2,611,085 | Masson | Sept. 16, 1952 |
| 2,615,127 | Edwards | Oct. 21, 1952 |
| 2,640,883 | Buchner | June 2, 1953 |
| 2,719,226 | Gordon | Sept. 27, 1955 |

OTHER REFERENCES

Seely, "Electron-Tube Circuits," McGraw-Hill, 1950, pages 113, 114, 115, 116 relied on.